Figure 1:
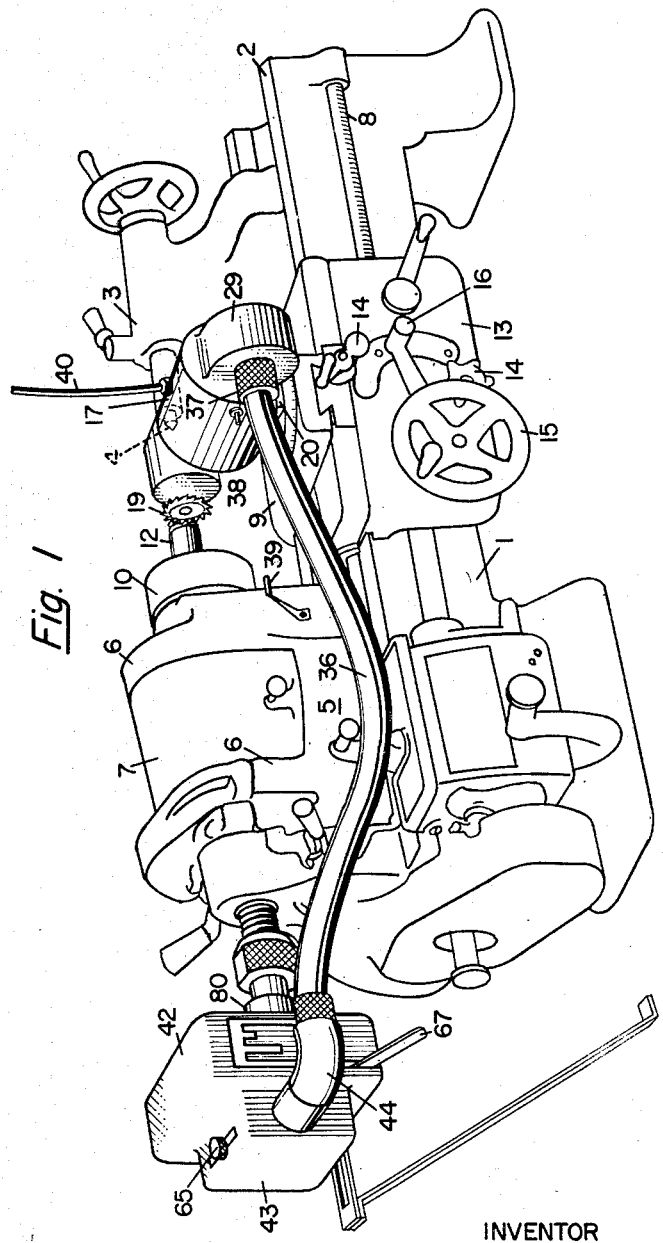

Jan. 8, 1957  A. SIMSACK  2,776,604
MILLING ATTACHMENTS FOR LATCHES
Filed Aug. 14, 1952  4 Sheets-Sheet 1

INVENTOR
ANTON SIMSACK
BY
*J. Stuart Freeman*
ATTORNEY

INVENTOR
ANTON SIMSACK
BY
*J. Stuart Freeman.*
ATTORNEY

INVENTOR
ANTON SIMSACK
ATTORNEY

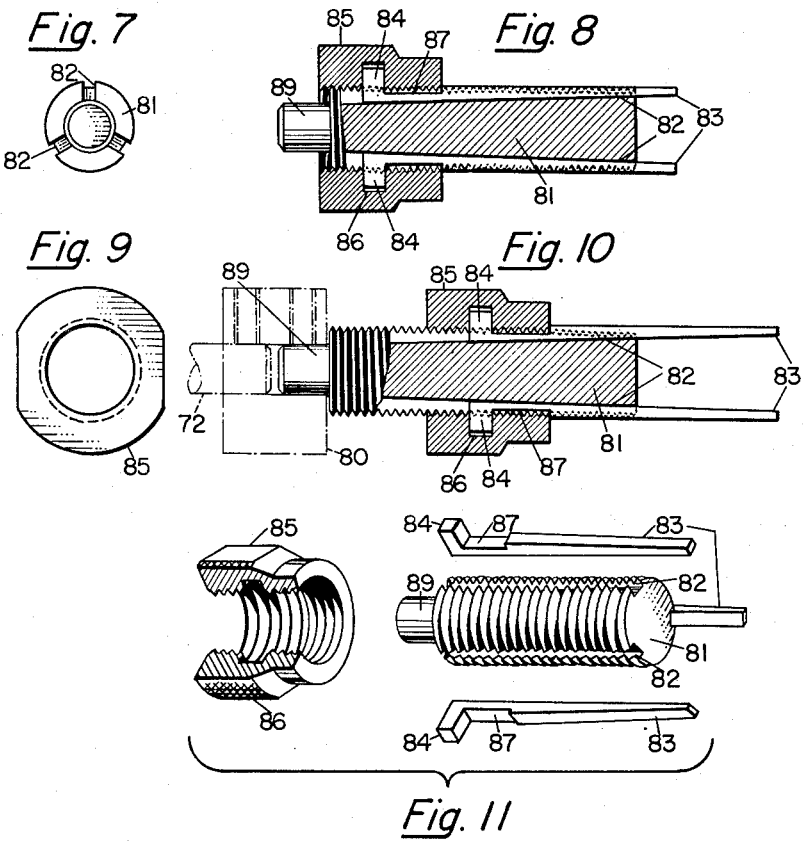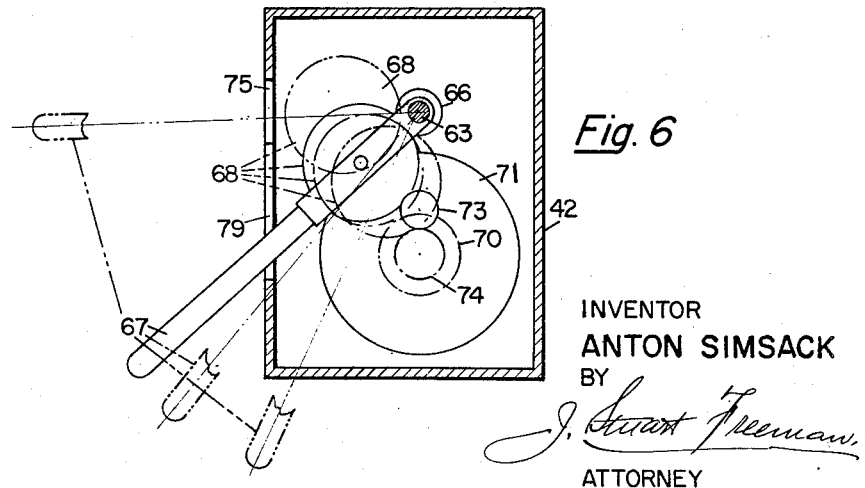

United States Patent Office 2,776,604
Patented Jan. 8, 1957

2,776,604

MILLING ATTACHMENTS FOR LATHES

Anton Simsack, Philadelphia, Pa.

Application August 14, 1952, Serial No. 304,335

2 Claims. (Cl. 90—11.64)

The object of the invention is to provide improvements in means for cutting screw threads in all kinds of materials broadly speaking, but more particularly in a milling attachment that can be operatively mounted upon a machine lathe, and set and adjusted to cut every known type of thread and of any desired spiral pitch, as a rod, shaft, or the like is being rotatably supported by the lathe.

Another and, in fact, one of the principal objects is to provide a device or mechanism of this class, that embodies its own source of motive power, as for example an electric motor, and connections and couplings whereby the power of said source is made available to drive the lathe and the piece of work operatively supported thereby, as well as the milling tool.

A further object is to provide a device of this class, that can be readily secured to the usual tool carrier with which every lathe is provided, and which, after having secured to it the particular type of rotary cutter necessary to cut a given thread, can be adjusted as any other tool with respect to the lathe bed, so as to operatively position said cutter in any desired position, height, angle, and otherwise, as may be required by the work to be performed.

Still another object is to provide in such a device the combination of a support adapted to be normally secured to a lathe's tool carrier, a motor, a spindle for a milling cutter, reduction gearing between said motor and said spindle, a reduction gear and reversing unit adapted to be normally secured to the live spindle of the lathe, and a flexible driving element connecting said motor to said unit.

And a still further object is to provide a combination such as last set forth, with the omission of said reduction unit, and the inclusion instead of a specially designed expansion coupling, whereby the end of said flexible driving element may be speedily connected operatively within the usual open end of said live spindle, said coupling likewise being as well adapted for use in various machine assemblies other than this particular lathe and milling device combination.

The present invention offers numerous advantages over lathes and milling machines considered as independent thread-cutting devices, and over other attempts to provide combined lathes and thread-cutting attachments therefor, among such advantages being the following: it makes possible the cutting of any form of special taps and dies by any machine shop, offers readily portable thread-cutting equipment for ships, submarines, military and other mobile units, mechanical and research laboratories when space is at a premium; effects the cutting of threads in any plastic and other relatively soft or granular materials; permits the cutting of multiple threads of all sizes in all materials without injury to the side walls and edges of threads already cut during a previous revolution of the work; reduces the overall set-up and cutting time for all threads under previous conditions involving the use of independent lathes and milling machines; increases the accuracy of the thread-cutting of all materials; retains much longer the tool shape and permits and insures closer tolerances; requires less skilled labor for thread-cutting; utilizes the same cutting tool for all materials; insures full-clean-cut threads at the end of each cut, thereby eliminating undercuts, nicks and other irregularities; and other advantages as will hereinafter appear.

Figure 2:
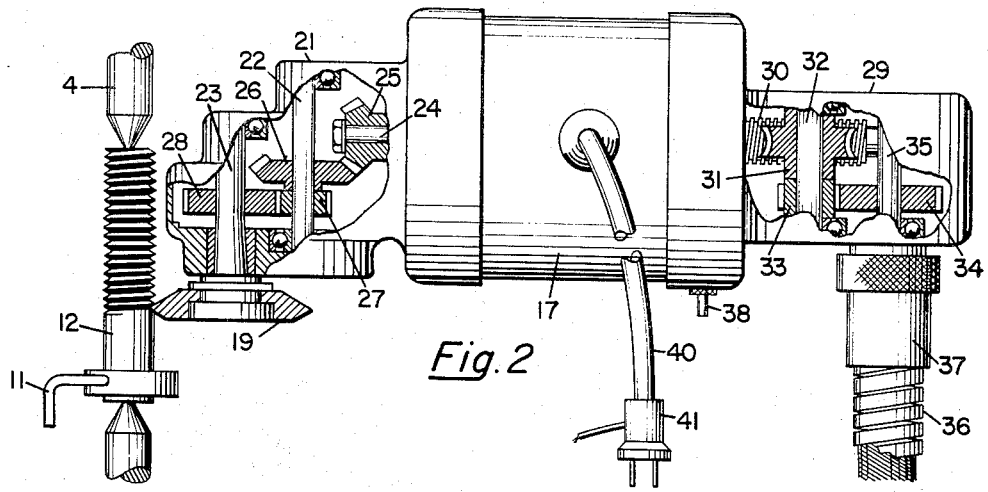
Figure 3:
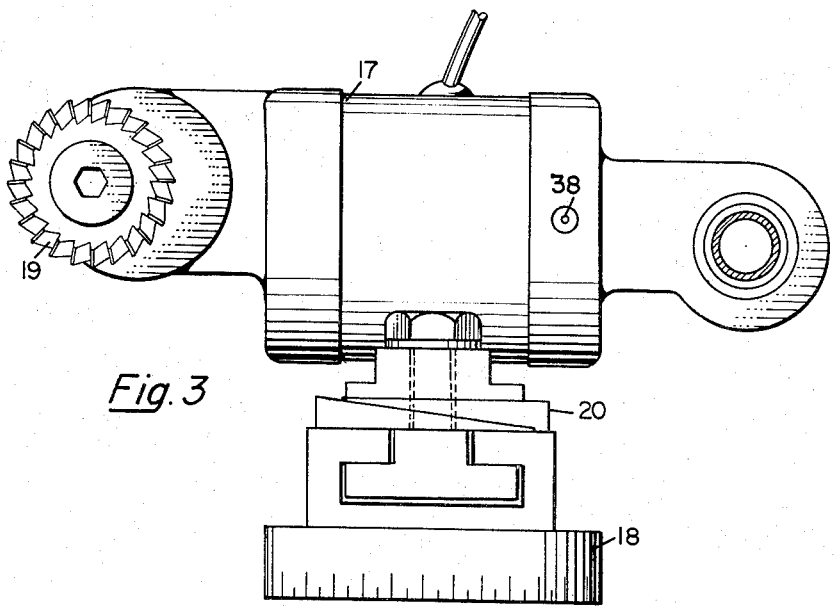
Figure 4:
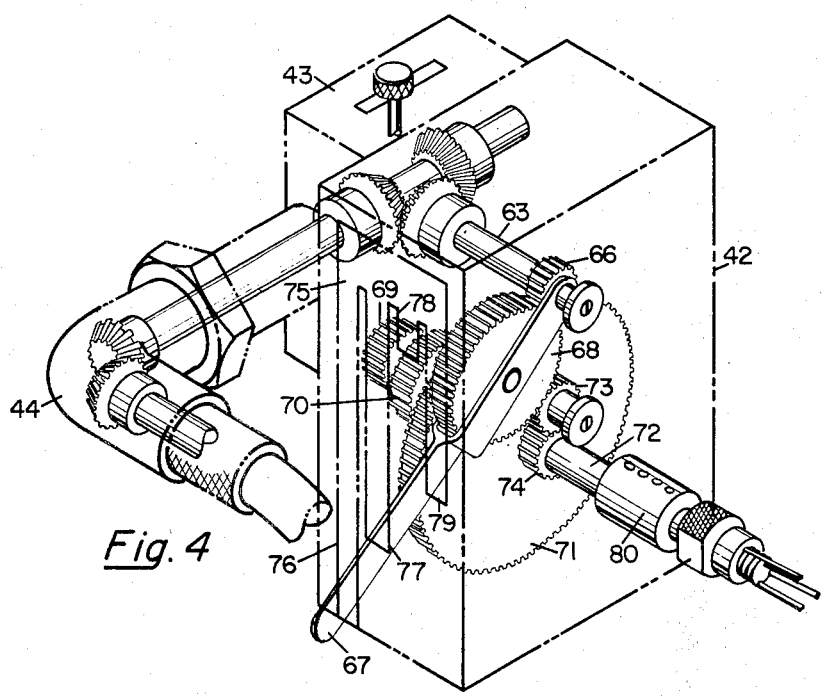
Figure 5:
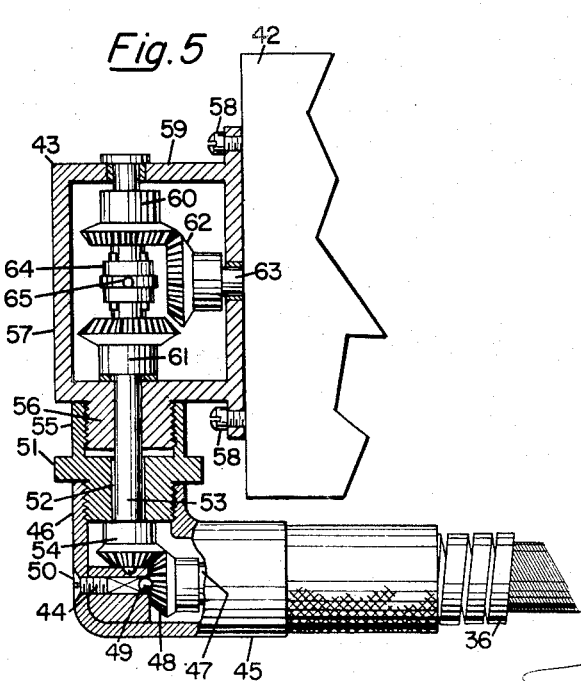
Figure 12:
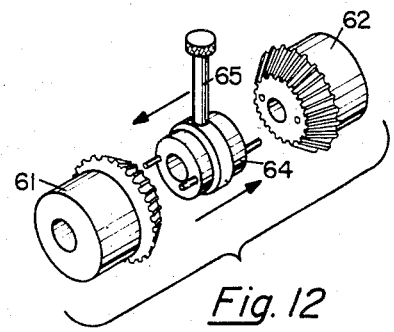

With the objects and advantages thus briefly set forth, the invention comprises further details of construction and operation, which are hereinafter fully described in the following specification, when read in conjunction with the accompanying drawings, in which Fig. 1 is a perspective view of a representative lathe to which the improved milling attachment is secured with the milling tool in operative position; Fig. 2 is an enlarged plan view of the motor and milling tool unit in the position of cutting a thread in a bar supported by and between two lathe centers, portions of said unit being cut away to show the gear connections between the motor shaft and said tool in the rear, and between said motor shaft and the flexible transmission shaft in the front; Fig. 3 is a left hand elevational view of the motor and tool unit and its immediate support; Fig. 4 is a perspective view showing the general arrangement of the variable speed-reducing gear combinations between the flexible shaft and the live spindle of the lathe within a "phantom" housing; Fig. 5 is a horizontal section of the gear connections, including the reversing unit, between the reducing gear unit and the flexible shaft of Fig. 4; Fig. 6 is a diagrammatic view illustrating the various positions of the speed-changing lever and connected gear; Fig. 7 is an end elevation of an expanding nut comprising one element of an improved coupling employed to operatively but detachably connect the flexible shaft to the live spindle of the lathe; Fig. 8 is a longitudinal section through such coupling with its expandable members in radially retracted positions; Fig. 9 is an end elevation of the adjusting nut per se; Fig. 10 is a section similar to Fig. 8 but with the several members thereof longitudinally shifted to create a radial expansion of the spindle-engaging members; Fig. 11 is an exploded perspective view of the several parts of the improved coupling; and Fig. 12 is a perspective view of the bevel-gear and clutch elements of the reversing unit per se.

Referring to the drawings, any well known type of machine lathe is represented as comprising essentially a bed 1, that may rest directly upon a bench or other available support, or instead upon the floor by means of suitable legs and feet (not shown), and which bed is provided upon its uppermost surface with the usual track 2, that serves as a guide for the rectilinear movement of the customary tail stock 3 with its customary dead center 4. To the opposite or left hand end of said bed is fixedly secured the usual head stock 5, comprising a pair of spaced bearing posts 6, between which is positioned beneath a cover 7 the usual speed varying mechanism, while beneath said head stock and upon the front of said bed is positioned the housing of a speed-controlling gear train, that controls the rotation of the worm feed 8 by which the tool-supporting base 9 is caused to move longitudinally and/or transversely of said bed.

Extending through and between said bearing posts is a live spindle, upon the right hand end of which is carried any desired form of chuck 10, or a face plate-and-dog combination represented in Fig. 2 by the dog 11, whereby a bar, rod, shaft, or other piece of work 12 is clamped and rotated upon a fixed axis, either as determined by said live spindle alone, or in cooperation with the tail stock 3 and the dead center 4. Said work piece it will be understood in the present setup is destined to be provided with any of the possible types of threads, or with any other form of trimming or shaping such as is ordinarily heretofore done in a separate milling machine.

The tool-supporting base 9 rests directly upon and is guided in its normal path of movement by said track, and comprises a forwardly positioned, depending enclosure 13 that shields a suitable clutch device represented by the locking lever 14, that when desired couples said tool-supporting base 9 with the worm feed 8. Said last-mentioned base is caused to travel forwardly and rearwardly upon and transversely of said base 9 by suitable well known means represented by the hand lever 14a, while longitudinal adjustment upon said bed is effected by manual rotation of the wheel 15, and locked in any desired position for automatic feed by the lever 16.

Preferably secured detachably upon said tool base is a motor 17, that is adapted to be oriented to any desired angle upon any desired form of turret structure 18, the effective elevation of the rotatable milling tool or wheel 19 being regulated in any suitable manner with respect to the axis of rotation of the work piece, as for example by means of a double wedge 20, or instead any well known form of rocker element with which the tool and motor support may be equipped. Any such details are merely for the proper vertical positioning of the milling tool or wheel with respect to said work piece, whether the latter is supported solely by said live spindle or by and between both said live spindle and said dead center.

Within a forwardly projecting, angular extension 21 of the casing of said motor 17 are a pair of transversely extending shafts 22 and 23. The shaft 24 of said motor carries a bevel gear 25, that meshes with a bevel gear 26 on the shaft 22, which also carries a spur gear 27 that meshes with a spur gear 28 carried by the second transverse shaft 23, while to the freely projecting outer end of said last mentioned shaft is detachably secured any suitable form of milling tool or wheel 19. The relative sizes of the various gears 25, 26, 27 and 28 may be whatever is desired, but as here illustrated are of such relationship that the relatively high speed of the motor and its shaft 24 is reduced somewhat, in order that the speed of the tool will not be too high to effectively cut the metal, plastic, or other material, of which the work piece is composed. Furthermore, if desired, this ratio between the speeds of the motor and the cutting tool may be made variable, by providing a suitable type of ratio-changing mechanism, all within the scope of the invention.

Within the normal front portion of said motor casing, or an extension 29 thereof, the freely extending end of said motor shaft is provided with a worm 30, that meshes with a worm gear 31 carried by a transversely extending shaft 32. Mounted upon this last mentioned shaft is a spur gear 33, that meshes with a spur gear 34 carried by a second transversely positioned shaft 35, that projects freely from said motor casing extension and has detachably secured to it one end of a flexible shaft represented by the tubular protective casing 36, which is itself detachably secured to said casing by means of a suitable coupling 37.

Within said motor casing is an electric control switch represented by a plunger 38, that extends horizontally from said casing, and which is adapted to engage a relatively fixed stop 39, that is secured to said lathe bed but which can be shifted, when desirable, to any other position than that shown longitudinally of said bed. There may also be a similar stop upon the opposite end of said bed, while a correspondingly second control switch may be carried by the opposite side of said motor casing, if desired, in order to provide for arresting the movement of said tool support, motor and milling tool when moving in the opposite direction. Current may be fed to said motor in any suitable manner, and is hereby represented by the fragmentary portion of a flexible extension cord 40, carrying upon its free end a plug 41, or other desired connection for engagement with a source of electric current.

The opposite end of said flexible shaft is operatively connected to the hollow outer end of said live spindle, either by means of an expandable coupling, such as that shown in Figs. 7 to 11 and hereinafter described, or by way of a variable gear housing 42, and also an intervening reversing-gear housing 43 (Figs. 4, 5 and 12), if desired. The full set of elements thus mentioned is here shown, including an L connection 44 comprising two arms 45 and 46. Within the arm 45 is a shaft 47, to the outer end of which is detachably connected said flexible shaft, the protective casing 36 of said shaft being detachably connected to said L arm, while the inner end of said shaft 47 carries a bevel gear 48, the end or longitudinal thrust of this last mentioned shaft being limited by an antifriction bearing 49, that is normally positioned by, and which can be replaced by first removing, a screw plug 50 in said L.

The other arm 46 of said L is closed by a screw coupling 51, having an axial bore 52 through which loosely revolves a shaft 53, that carries a bevel gear 54 which meshes with the first bevel gear 48 in said L. The opposite outer portion 55 of said coupling affords a means for detachably connecting the same to a boss 56 on said reversing-gear housing 43, which housing is preferably detachably secured at 58 to said variable gear housing 42. Within this reversing-gear housing, the shaft 53 is journaled in the opposite end wall 59, as well as in said boss 56, and rotatably carries two spaced bevel gears 60 and 61, that mesh selectively with an interposed bevel gear 62, carried by a shaft 63 that extends through the variable gear housing 42, said gears 60 and 61 being operatively connected to rotate with the shaft 53 by means of a longitudinally shiftable clutch element 64, which can be manually moved by means of a pin or stud 65, that extends upwardly and projects freely from the surrounding casing 43. When said stud is in central position, the clutch element is not in engagement with either of the bevel gears 60 and 61, and no movement of the shaft 53 is imparted to the shaft 63 in either direction. However, when said stud is shifted in either extreme position, clockwise rotation of said first mentioned shaft 53 operates to rotate the second shaft 63 in the same or opposite directions, respectively, and likewise the live spindle of the lathe through the variable gears within the housing 42.

Referring to Figs. 4 and 6, the shaft 63 is shown as slideably carrying a pinion 66 keyed to it, and at the same time serves as a pivot bearing or support for the fixed inner end of a gear-shift lever 67, that rotatably supports an enlarged idler 68, that is in mesh with said pinion and is adapted to mesh selectively with a high-speed gear 69, or an intermediate gear 70, or a low-speed gear 71, fixedly carried by a shaft 72, or instead with an intermediate idler pinion 73 and small gear 74 also carried by said shaft 72. Selection of the proper gear combination to determine relative speed and direction between the shafts 63 and 72, is effected by first lifting said lever 67 angularly, shifting it longitudinally of the shaft 63, and then lowering it into mesh with the proper gears 69, 70, 71 and 73. The housing 42 is provided with an aperture 75 that has four depending extensions 76, 77, 78 and 79, which when said lever is depressed into any one of them, serves to secure it against lateral shifting and resulting dislodgement of its idler 68 from the particular gear with which it is in mesh.

The shaft 72 extends freely from the right hand side of said last mentioned housing 42, and is provided with a sleeve 80 or other suitable means for securing it to the expandable coupling shown in Figs. 7 to 11, and thereby to the live spindle of the lathe. In this manner, operation of the motor 17 serves to revolve the cutting tool or wheel 19, and at the same time rotate said live spindle, with the result that the thread (or other form of cut) is cut in the surface of the work piece 12, as the tool base 9 is fed longitudinally of the lathe bed, the ratio of the speed of rotation of the said work piece with respect to the rectilinear movement of said base being determined by the position of the lever 67 in conjunction with the general clutch mechanism within the housing 43.

Referring to Figs. 7 to 11, an improved expandable coupling is shown as comprising a central body portion 81, externally threaded and provided with preferably three circumferentially spaced, longitudinally extending grooves 82, whose depth decreases from left to right, and in which are slidably positioned substantially L-shaped members, comprising slender elongated portions 83 that taper towards their free right ends, and at their left ends are provided with radially outwardly directed extensions 84. Surrounding said body portion and in operative engagement with its threads is a nut 85, having an internal annular recess 86 into which the extensions 84 are slidably positioned, while the outer surface of the elongated portion 83 of each of said L-shaped members adjacent to the extensions 84 is provided with a shallow cutaway recess 87, to permit the free passage of the threads of said nut while continuing to rotate and, as it progresses towards the right end of said body portion, causes the overall diameter represented by the radially outer surfaces of said L-shaped members jointly to expand, and thereby tightly engage frictionally the inner surface of the customary hollow left end of the live spindle of the lathe. Reverse rotation of said nut causes a decrease in said diameter and resulting release of said coupling from said live spindle. Preferably the slope of the radially inner surfaces of said grooves is equal to the taper of the elongated portions of said L-shaped members, so that the outwardly directed surfaces of the latter will at all times represent the geometrical elements of a cylinder. The outermost surface of said nut, while generally knurled, may be provided with segmental flattened surfaces 88, to facilitate being engaged and rotated by a wrench (not shown). The left end 89 of said body portion 81 is reduced, and adapted to be secured by the sleeve 80 or the like, to the drive shaft 72 that projects from said speed-controlling gear housing 42.

Having thus described my invention, what I claim and desire to protect by Letters Patent of the United States is:

1. A device adapted to be attached to a screw machine lathe having a hollow spindle shaft opening to the outer free end of the machine, comprising a motor having its drive shaft extending at both ends thereof, means adapted to detachably secure said motor to the tool-slide of a lathe, a gear unit connected to each of the opposite ends of the motor shaft, a rotary tool means driving a tool by said motor through one of said units, an expansion coupling adapted to be inserted into and expanded into frictional engagement with the inner surface of the hollow spindle of a lathe at the outer free end thereof to drive the same from said motor, and flexible shaft means connected at one end to said motor through the other of said gear units, and connected at its other end to said coupling, whereby said motor rotates both said tool and said spindle concurrently.

2. A device according to claim 1, in combination with a gear unit included in the connection of said flexible shaft.

References Cited in the file of this patent

UNITED STATES PATENTS

| 882,290 | Bowen | Mar. 17, 1908 |
| 1,108,735 | Frykman | Aug. 25, 1914 |
| 2,341,061 | Rhodes et al. | Feb. 8, 1944 |
| 2,495,927 | Francis | Jan. 31, 1950 |
| 2,605,121 | Ensinger | July 29, 1952 |
| 2,611,632 | Harris | Sept. 23, 1952 |

FOREIGN PATENTS

| 208,437 | Great Britain | 1923 |
| 250,427 | Switzerland | 1948 |
| 325,520 | Great Britain | Feb. 20, 1930 |